US012516501B2

(12) United States Patent
Song et al.

(10) Patent No.: US 12,516,501 B2
(45) Date of Patent: Jan. 6, 2026

(54) TRAJECTORY CONTROLLER FOR CONTINUOUS TRACK VEHICLES

(71) Applicant: Baidu USA, LLC, Sunnyvale, CA (US)

(72) Inventors: Ruitao Song, Sunnyvale, CA (US); Liangjun Zhang, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 378 days.

(21) Appl. No.: 18/302,429

(22) Filed: Apr. 18, 2023

(65) Prior Publication Data
US 2024/0352708 A1    Oct. 24, 2024

(51) Int. Cl.
*E02F 9/20* (2006.01)
*E02F 9/26* (2006.01)
*G06N 7/01* (2023.01)

(52) U.S. Cl.
CPC .......... *E02F 9/2045* (2013.01); *E02F 9/205* (2013.01); *E02F 9/26* (2013.01); *G06N 7/01* (2023.01)

(58) Field of Classification Search
CPC .......... E02F 9/2045; E02F 9/205; E02F 9/26; G06N 7/01; B66F 9/07572–07577; B66C 5/00; B66C 7/00; B66C 9/16–18; G05D 1/00; B60W 40/00
See application file for complete search history.

(56) References Cited

U.S. PATENT DOCUMENTS

| 5,229,944 | A | * | 7/1993 | Yasuno | B60T 8/1755 303/146 |
| 5,590,041 | A | * | 12/1996 | Cooper | E02F 9/2045 180/6.7 |
| 6,076,030 | A | * | 6/2000 | Rowe | G05B 19/19 701/50 |
| 9,376,108 | B2 | * | 6/2016 | Fairgrieve | B60W 10/12 |
| 9,428,184 | B2 | * | 8/2016 | Kikuchi | B60W 30/025 |
| 9,965,868 | B2 | * | 5/2018 | Liu | G06F 16/29 |
| 11,409,287 | B2 | * | 8/2022 | Zhang | G05D 1/0088 |

(Continued)

OTHER PUBLICATIONS

M. Z. Hashmi et al., "What Lies Beneath One's Feet? Terrain Classification Using Inertial Data of Human Walk," Applied Sciences, vol. 9, 2019. (24pgs).

(Continued)

*Primary Examiner* — Angelina M Shudy
(74) *Attorney, Agent, or Firm* — Oppedahl Patent Law Firm LLC

(57) ABSTRACT

Embodiments of a methodology for controlling a vehicle includes (i) determining a first command signal for a first locomotion component of a vehicle and a second command signal for a second locomotion component of the vehicle, (ii) based upon a terrain classification, selecting a first pre-trained model for the first locomotion component and a second pre-trained model for the second locomotion component, (iii) determining a first signal for the first locomotion component of the vehicle by utilizing the first command signal and the second command signal as input to the first pre-trained model and a second signal for the second locomotion component of the vehicle by utilizing the first command signal and the second command signal as input to the second pre-trained model, and (iv) controlling the first locomotion component of the vehicle using the first signal and the second locomotion component of the vehicle using the second signal.

13 Claims, 9 Drawing Sheets

(56) References Cited

U.S. PATENT DOCUMENTS

| | | | |
|---|---|---|---|
| 11,543,831 B2* | 1/2023 | Reid | G05D 1/0088 |
| 12,280,796 B1* | 4/2025 | Schleede | B60W 60/0011 |
| 12,286,151 B1* | 4/2025 | Greiff | B62D 13/06 |
| 2005/0183416 A1* | 8/2005 | Hayashi | E02F 9/2296 60/445 |
| 2008/0086248 A1* | 4/2008 | Lu | B60W 40/101 701/41 |
| 2008/0133066 A1* | 6/2008 | Takenaka | B62D 6/003 701/1 |
| 2009/0088918 A1* | 4/2009 | Takenaka | B60T 8/17551 701/31.4 |
| 2012/0179635 A1* | 7/2012 | Vasudevan | G06T 7/521 703/2 |
| 2013/0313033 A1* | 11/2013 | Elliott | F16H 61/47 701/99 |
| 2014/0032046 A1* | 1/2014 | Meffert | E02F 9/2087 701/41 |
| 2014/0156152 A1* | 6/2014 | Faivre | E02F 9/2253 701/50 |
| 2014/0257621 A1* | 9/2014 | Zych | G01C 21/20 701/410 |
| 2015/0112508 A1* | 4/2015 | Kato | B60K 28/16 701/1 |
| 2015/0275482 A1* | 10/2015 | Hill | E02F 3/847 701/50 |
| 2017/0113697 A1* | 4/2017 | Faivre | B60W 40/105 |
| 2018/0043932 A1* | 2/2018 | Borud | B62D 55/06 |
| 2019/0113924 A1* | 4/2019 | Falconer | G05D 1/0274 |
| 2019/0155229 A1* | 5/2019 | Herrera | B60W 50/00 |
| 2019/0338490 A1* | 11/2019 | Roulston | E02F 9/265 |
| 2020/0094843 A1* | 3/2020 | Bärecke | B60W 40/068 |
| 2020/0290625 A1* | 9/2020 | Berntorp | B60W 30/18172 |
| 2020/0293057 A1* | 9/2020 | Reid | G06V 20/56 |
| 2020/0331317 A1* | 10/2020 | Nasu | B60W 10/184 |
| 2021/0062472 A1* | 3/2021 | Daimon | G09G 5/37 |
| 2021/0078592 A1* | 3/2021 | Febbo | G06V 40/103 |
| 2021/0140145 A1* | 5/2021 | Daimon | E02F 9/26 |
| 2021/0206430 A1* | 7/2021 | North | B62D 11/04 |
| 2021/0223774 A1* | 7/2021 | Zhang | G05D 1/0088 |
| 2021/0264300 A1* | 8/2021 | Staudinger | G06V 10/762 |
| 2021/0310216 A1* | 10/2021 | Daimon | E02F 9/26 |
| 2021/0323156 A1* | 10/2021 | Couvignou | B25J 9/102 |
| 2022/0081878 A1* | 3/2022 | Phadtare | E02F 3/841 |
| 2022/0111736 A1* | 4/2022 | Takeuchi | B60L 15/20 |
| 2022/0307235 A1* | 9/2022 | Taylor | E02F 3/308 |
| 2022/0325502 A1* | 10/2022 | Hobbs | G01S 5/0247 |
| 2022/0350991 A1* | 11/2022 | Vesperman | G06T 7/40 |
| 2023/0038422 A1* | 2/2023 | Redden | G06V 20/56 |
| 2023/0046970 A1* | 2/2023 | Li | B60W 40/068 |
| 2023/0053964 A1* | 2/2023 | Wang | E02F 3/439 |
| 2023/0100858 A1* | 3/2023 | Hirao | B60G 17/015 280/5.515 |
| 2023/0166722 A1* | 6/2023 | Hajiloo | B60W 30/02 701/36 |
| 2023/0286523 A1* | 9/2023 | Dumas | B60W 40/068 |
| 2023/0313490 A1* | 10/2023 | Anderson | G05D 1/021 172/811 |
| 2024/0116565 A1* | 4/2024 | Subramanian | B62D 7/09 |
| 2024/0131705 A1* | 4/2024 | Ye | B25J 9/1664 |
| 2024/0270084 A1* | 8/2024 | Takahashi | B60W 10/08 |
| 2024/0352708 A1* | 10/2024 | Song | E02F 9/26 |
| 2024/0370016 A1* | 11/2024 | Lu | G05D 1/0088 |
| 2025/0018950 A1* | 1/2025 | Oh | B60W 10/04 |
| 2025/0163681 A1* | 5/2025 | Gajic | E02F 9/265 |
| 2025/0171983 A1* | 5/2025 | Gajic | E02F 9/265 |
| 2025/0198126 A1* | 6/2025 | Hobbs | E02F 9/02 |
| 2025/0313094 A1* | 10/2025 | Sadeghi Kati | B60L 15/2036 |
| 2025/0313229 A1* | 10/2025 | Davins | B60W 10/18 |

OTHER PUBLICATIONS

F. Lomio et al., "Surface type classification for autonomous robot indoor navigation," arXiv preprint arXiv:1905.00252, 2019. (5 pgs).

D. Khan et al., "Recent advances in vision-based indoor navigation: A systematic literature review," Computers & Graphics, 2022. [Abstract] (9pgs).

A. J. Sathyamoorthy et al., "DenseCAvoid: Real-time Navigation in Dense Crowds using Anticipatory Behaviors," arXiv preprint arXiv:2002.03038, 2020. (8pgs).

A. J. Sathyamoorthy et al., "Frozone: Freezing-free, pedestrian-friendly navigation in human crowds," arXiv preprint arXiv:2003.05395, 2020. (9pgs).

D. Droeschel et al., "Continuous Mapping & Localization for Autonomous Navigation in Rough Terrain using a 3D Laser Scanner" Robotics & Autonomous Systems, vol. 88, 2017.(20pg).

K. Weerakoon et al., "TERP: Reliable Planning in Uneven Outdoor Environments using Deep Reinforcement Learning," arXiv preprint arXiv:2109.05120, 2022. (8pgs).

J. Liang et al., "AdaptiveON: Adaptive Outdoor Local Navigation Method for Stable and Reliable Actions," arXiv preprint arXiv:2205.03517, 2022. (10pgs).

A. Kumar et al., "RMA: Rapid Motor Adaptation for Legged Robots," arXiv preprint arXiv:2107.04034, 2021. (15pgs).

H. Karnan et al., "VI-IKD: High-Speed Accurate Off-Road Navigation using Learned Visual-Inertial Inverse Kinodynamics," arXiv preprint arXiv:2203.15983, 2022. (8pgs).

J. Dallas et al., "Terrain Adaptive Trajectory Planning and Tracking on Deformable Terrains," IEEE Transactions on Vehicular Technology, vol. 70, No. 11, 2021. (14pgs).

T. Guan et al., "GA-Nav: Efficient Terrain Segmentation for Robot Navigation in Unstructured Outdoor Environments," arXiv preprint arXiv:2103.04233, 2022. (12pgs).

K. Viswanath et al., "Offseg: A Semantic Segmentation Framework for Off-Road Driving," arXiv preprint arXiv:2103.12417, 2021. (6pgs).

A. Chilian et al., "Stereo camera based navigation of mobile robots on rough terrain," in 2009 IEEE/RSJ International Conference on Intelligent Robots & Systems, 2009. (6pgs).

J. Xue et al., "Deep texture manifold for ground terrain recognition," in 2018 IEEE/CVF Conference on Computer Vision & Pattern Recognition, 2018. (10pgs).

S. Laible et al., "3D LIDAR- and Camera-Based Terrain Classification Under Different Lighting Conditions," in AMS, 2012. (9pgs).

D.-V. Nguyen, "Vegetation Detection and Terrain Classification for Autonomous Navigation," Ph.D. dissertation, 2013. (212 pgs).

J. Xue et al., "Differential angular imaging for material recognition," in 2017 IEEE Conference on Computer Vision & Pattern Recognition (CVPR), 2017. (10pgs).

C. C. Ward, "Terrain Sensing and Estimation for Dynamic Outdoor Mobile Robots," Ph.D. dissertation, Massachusetts Institute of Technology, 2007. (126pgs).

C. C. Ward et al., "Speed-independent vibration-based terrain classification for passenger vehicles," Vehicle System Dynamics, vol. 47, 2009. [Abstract] (2pgs).

Z. Liu et al., "Swin Transformer V2: Scaling Up Capacity and Resolution," in Proc. of the IEEE/CVF Conference on Computer Vision & Pattern Recognition (CVPR), 2022. (11pgs).

E. Xie et al., "SegFormer: Simple and Efficient Design for Semantic Segmentation with Transformers," in Advances in Neural Information Processing Systems, 2021. (14pgs).

Y. Yuan et al., "Object-Contextual Representations for Semantic Segmentation," in 16th European Conference Computer Vision (ECCV 2020), Aug. 2020. (18pgs).

Z. Dai et al., "CoAtNet: Marrying Convolution and Attention for All Data Sizes," in 35th Conference on Neural Information Processing Systems (NeurIPS), 2021. (13pgs).

A. J. Sathyamoorthy et al., "TerraPN: Unstructured Terrain Navigation using Online Self-Supervised Learning," arXiv preprint arXiv:2202.12873, 2022. (10pgs).

O. Russakovsky et al., "ImageNet Large Scale Visual Recognition Challenge," arXiv preprint arXiv:1409.0575, 2015. (43pgs).

T.-Y. Lin et al., "Microsoft COCO: Common Objects in Context," arXiv preprint arXiv:1405.0312, 2014. (14pgs).

T. Guan et al., "TNS: Terrain Traversability Mapping and Navigation System for Autonomous Excavators," arXiv preprint arXiv:2109.06250, 2022. (15pgs).

(56) References Cited

OTHER PUBLICATIONS

C. D. McKinnon et al., "Experience-Based Model Selection to Enable Long-Term, Safe Control for Repetitive Tasks Under Changing Conditions," In: IEEE/RSJ Int. Conf. on Intelligent Robots & Systems (IROS), IEEE, 2018. (8pgs).

C. H. Lee et al., "Double-track mobile robot for hazardous environment applications," Advanced Robotics, vol. 17, No. 5, 2003 [Abstract]. (2pgs).

Vincent et al., "A combined reactive and reinforcement learning controller for an autonomous tracked vehicle," Robotics & Autonomous Systems, vol. 60, No. 4, 2012 [Abstract]. (6pgs).

C. Zong et al., "An angle-changeable tracked robot with human-robot interaction in unstructured environments," Assembly Automation, vol. 40, No. 4, 2020 [Abstract]. (2pgs).

C. Ordonez et al., "Modeling and traversal of pliable materials for tracked robot navigation," in Unmanned Systems Technology XX, vol. 10640. SPIE, 2018 [Abstract]. (3pgs).

L. Hewing et al., "Learning-based model predictive control: Toward safe learning in control," Annual Review of Control, Robotics, & Autonomous Systems, vol. 3, 2020. (269pgs).

G. Torrente et al., "Data-Driven MPC for Quadrotors," arXiv preprint arXiv: 2102.05773, 2021. (8pgs).

A. H. Chang et al., "Every Hop is an Opportunity: Quickly Classifying and Adapting to Terrain During Targeted Hopping," In: International Conference on Robotics & Automation (ICRA), 2019. (7pgs).

M. Tan et al., "EfficientNet: Rethinking model scaling for convolutional neural networks," arXiv preprint arXiv:1905.11946, 2019. (10pgs).

A. Vaswani et al., "Attention is all you Need," arXiv preprint arXiv:1706.03762, 2017. (15pgs).

T. Guan et al., "VINet: Visual and Inertial-based Terrain Classification and Adaptive Navigation over Unknown Terrain," arXiv preprint arXiv:2209.07725, 2022. (7pgs).

A. Kurup et al., "Supervised terrain classification with adaptive unsupervised terrain assessment," In: SAE International Journal of Advances & Current Practices in Mobility, 2021. (9pgs).

* cited by examiner

| Lateral RMSE (m) | Adaptive | Carpet baseline | Mulch baseline |
|---|---|---|---|
| | 0.026 | 0.050 | 0.029 |

FIG. 5

TRAJECTORY CONTROLLER FOR CONTINUOUS TRACK VEHICLES

BACKGROUND

A. Technical Field

The present disclosure relates generally to systems and methods for computer learning that can provide improved computer performance, features, and uses. More particularly, the present disclosure relates to systems and methods for facilitating trajectory control of vehicles, such as continuous track vehicles.

It shall be noted that the subject matter discussed in the background section should not be assumed to be prior art merely because of it being mentioned in this background section. Similarly, a problem mentioned in the background section or associated with the subject matter of the background section should not be assumed to have been previously recognized in the prior art. The subject matter in the background section merely represents different approaches, which in and of themselves may also be inventions.

B. Background

Many trajectory control techniques have been developed for indoor navigation of autonomous vehicles. However, implementing trajectory control for outdoor navigation of autonomous vehicles is associated with many challenges, especially where multiple traversable terrains are present. Such challenges exist for continuous track vehicles, which use a continuous track as a mode of propulsion instead of wheels (or other means). The track is typically a flexible belt made up of metal and/or rubber that wraps around a series of wheels or rollers to provide traction and support. This design allows the vehicle to distribute its weight over a large area, which can provide better traction and/or stability on rough terrain, soft soil, snow, etc. Continuous track vehicles are commonly used in heavy construction, agriculture, military operations, transportation, and other domains. Examples of continuous track vehicles include excavators, bulldozers, and snowmobiles.

Most continuous track vehicles lack a conventional steering mechanism, with their wheels/rollers being arranged at fixed positions relative to the body of the vehicle. Continuous track vehicles typically steer by varying the speed and/or direction of the tracks on either side of the vehicle. For example, to turn left, the tracks on the left side of the vehicle may be slowed down or stopped while the tracks on the right side continue to move forward. Ideally, this causes the vehicle to pivot around a central point, turning to the left. In contrast, to turn right, the opposite is done, with the tracks on the right side slowed down or stopped while the tracks on the left side continue to move forward.

However, the steering operations employed by many continuous track vehicles often result in skidding or dragging of the tracks across the ground, which can result in positional slippage of one or more of the tracks. This slippage can make it difficult to accurately estimate the center of rotation and/or future position of the continuous track vehicle given the current states of the vehicle and the planned velocities of the different tracks thereof.

Accordingly, what is needed are improved systems, methods, and techniques for facilitating accurate trajectory control of continuous track vehicles.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 and FIG. 5 depict example test results from implementing an adaptive trajectory controller, according to embodiments of the present disclosure, to control a continuous track vehicle.

DETAILED DESCRIPTION OF EMBODIMENTS

Figure 1:
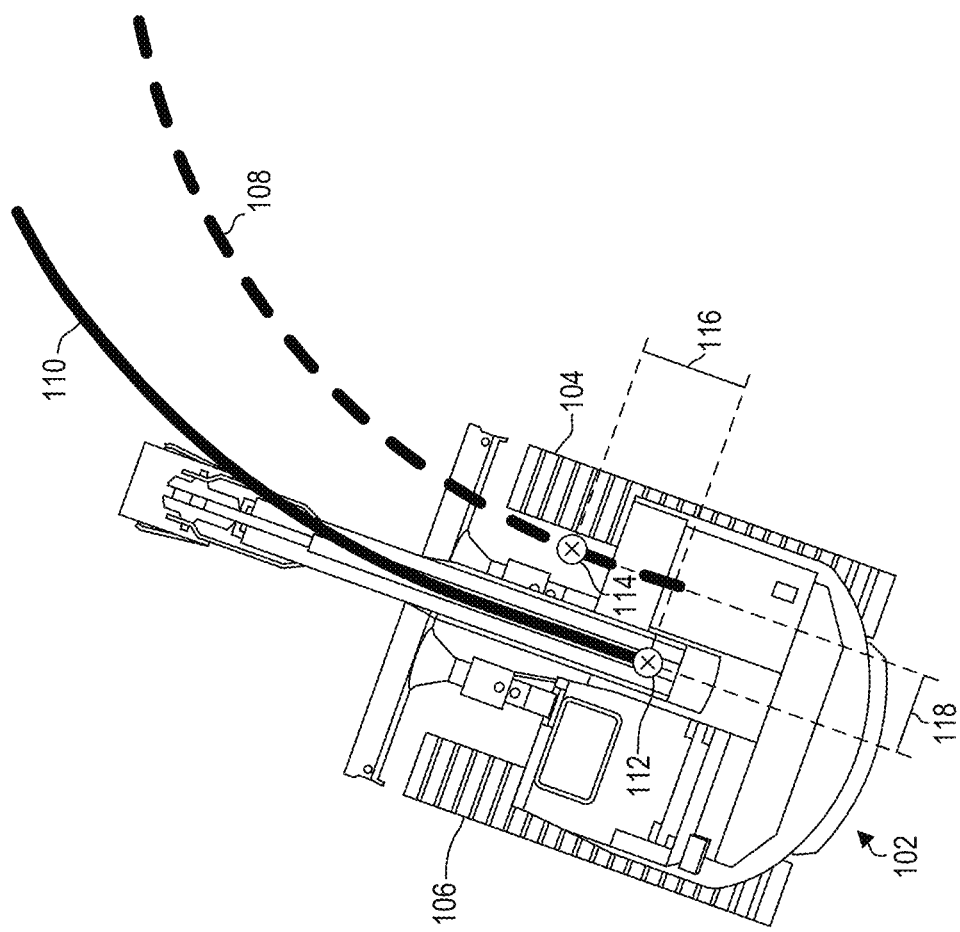
FIG. 1 depicts a conceptual representation of conventional trajectory tracking performance of a tracked vehicle, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of continuous track vehicles, aspects of the present disclosure are not so limited. Accordingly, aspects of the present disclosure may be applied or adapted for use in other contexts (e.g., for vehicles that utilize other types of locomotion components).

A. General Introduction

As noted above, implementing trajectory control for outdoor navigation of autonomous vehicles is associated with many challenges, especially for continuous track vehicles and where multiple traversable terrains are present. One difficulty is that the steering of many continuous track vehicles involves skidding or dragging of the tracks across the ground, causing positional slippage. This slippage can make it difficult to accurately estimate the center of rotation and/or future position of the continuous track vehicle given the planned trajectory of the vehicle.

For instance, FIG. 1 illustrates a conceptual representation of conventional trajectory tracking performance of a tracked vehicle (e.g., an excavator). FIG. 1 illustrates an autonomous excavator 102, which includes a left track 104 and a right track 106. As noted above, the left track 104 and the right track 106 may be turned at different speeds to enable the excavator 102 to turn. FIG. 1 illustrates a portion of a planned trajectory 108 that the excavator 102 is intended to traverse. Under conventional techniques, one or more low-level controllers calculate turning speeds for the left track 104 and the right track 106 based upon the planned trajectory 108. The low-level controller(s) then determine control signals (e.g., pulse-width modulation (PWM) signals) for causing actuation of the different tracks in accordance with the turning speeds via a lookup table that maps turning speeds to control signals. The control signals are then applied to motors for driving the left track 104 and the right track 106, causing the excavator 102 to traverse an actual trajectory 110.

As is evident from FIG. 1, the actual trajectory 110 fails to match the planned trajectory 108. For instance, FIG. 1 illustrates an example actual position 112 of the center of rotation of the excavator 102 contrasted with a planned position 114 of the center of rotation of the excavator 102. In the example of FIG. 1, interaction between the left track 104, the right track 106, and the terrain traversed by the excavator 102 leads to performance errors for the excavator 102, resulting in under-steering in the actual trajectory 110 of the excavator 102. The under-steering results in longitudinal error 116 and lateral error 118 between the planned position 114 and the actual position 112 of the center of the excavator 102.

At least some disclosed embodiments are directed to adaptive trajectory control techniques that may be implemented on continuous track vehicles. For instance, at least some disclosed embodiments utilize a controller to determine command signals (e.g., speed or turning speed command signals) for first and second continuous tracks of a continuous track vehicle. The command signals may be determined based upon current state input and planned trajectory input for the continuous track vehicle. Different models (with different model parameters) may be furthermore selected for determining different control signals for controlling the different continuous tracks. The different models may be selected based upon a terrain classification (and/or other intermediate data, such as image data and/or inertial tracking data). Each of the different models may utilize as input the command signals for all of the continuous tracks (determined by the controller) to determine the output control signal for its respective continuous track.

Such functionality may facilitate generation of individualized control signals for continuous tracks of continuous track vehicles in a manner that at least partially accounts for interactions between the continuous tracks and the terrain being traversed. Disclosed embodiments may thus contribute to reduced error between planned trajectories and actual trajectories of continuous track vehicles (e.g., reduced discrepancies between planned positions and actual positions of the axis of rotation for continuous track vehicles).

B. Model Pre-Training for Model Library

Figure 2:
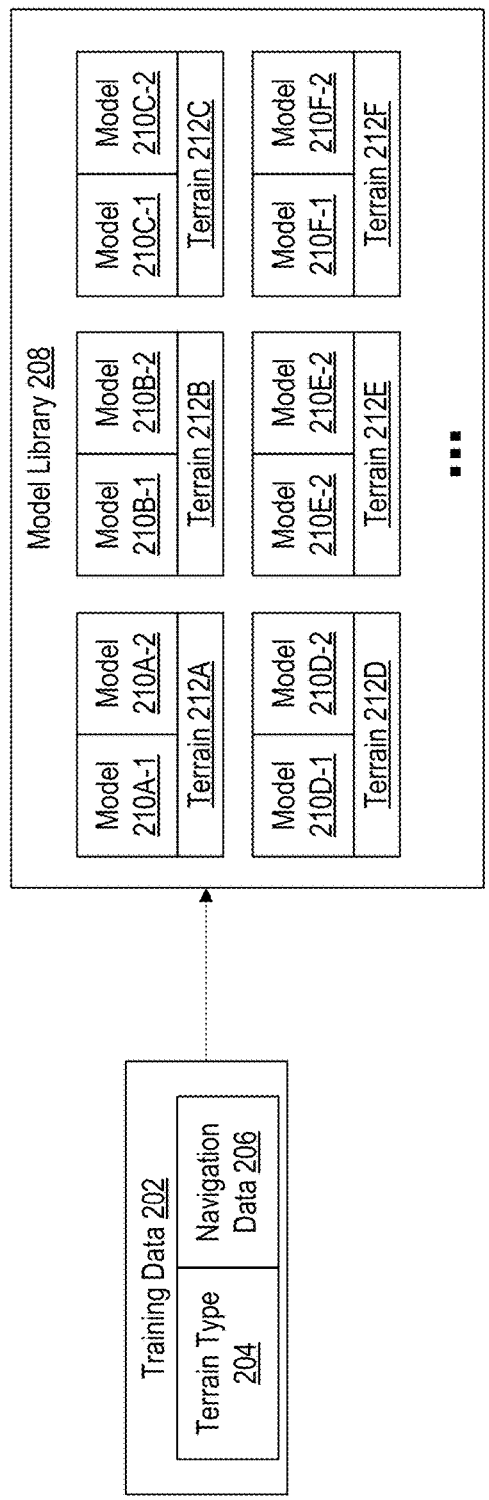
FIG. 2 depicts a conceptual representation of generating a model library for facilitating trajectory control of continuous track vehicles, according to embodiments of the present disclosure.

FIG. 2 depicts a conceptual representation of generating a model library 208 for facilitating trajectory control of continuous track vehicles. The model library 208 of FIG. 2 comprises a set of pre-trained models (e.g., models 210A-1, 210A-2, 210B-1, etc.). The pre-trained models of the model library 208 may take on various forms. In one or more embodiments, the pre-trained models of the model library 208 comprise Gaussian Process (GP) models or may be lookup tables based on model data or real-world data.

Each pre-trained model of the model library 208 may be configured to determine a (control) signal for controlling a locomotion component of a continuous track vehicle (e.g., a left track or a right track of an excavator or other continuous track vehicle). The pre-trained models of the model library 208 may utilize input command signals (e.g., target speed commands) to generate the control signals. The control signals generated via the pre-trained models of the model library may comprise, by way of non-limiting example, PWM signals.

The model library 208 may include various subsets of pre-trained models, as conceptually represented in FIG. 2 with the pre-trained models being spatially organized into different subsets. For instance, in the example of FIG. 2, a first subset of pre-trained models of the model library 208 includes models 210A-1 and 210A-2, and a second subset of pre-trained models includes models 210B-1 and 210B-2, etc. In one or more embodiments, each pre-trained model of any particular subset of pre-trained models of the model library 208 of FIG. 2 is associated with generating control signals to control a respective locomotion component of a continuous track vehicle. For instance, model 210A-1 of the first subset of pre-trained models may be associated with controlling a left track (or first track) of a continuous track vehicle, while model 210A-2 of the first subset of pre-trained models may be associated with controlling a right track (or second track) of a continuous track vehicle.

As is further represented in the example of FIG. 2, each subset of pre-trained models of the model library 208 may be correlated to or associated with a respective terrain type (e.g., a known terrain type). For instance, the first subset of pre-trained models is associated with terrain 212A, and the second subset of pre-trained models is associated with terrain 212B. In this regard, each pre-trained model of the model library 208 may be configured to generate control signals for a particular continuous track component (e.g., a right track or a left track) and for a particular type of terrain.

In the example of FIG. 2, training data 202 may be utilized to generate the model library 208. The training data 202 of FIG. 2 includes terrain type 204 and navigation data 206. The terrain type 204 may comprise the various known terrains associated with subsets of pre-trained models as noted above (e.g., terrain 212A, 212B, etc.). The navigation data 206 may comprise planned trajectory data, actual trajectory data, control signals (e.g., per-track PWM signals), and/or command or state signals (e.g., linear and/or angular speeds based on vehicle localization output) associated with operation of continuous track components of a continuous track vehicle on the various terrain types 204. One will appreciate, in view of the present disclosure, that different sets of navigation data 206 may be associated with different particular terrain types 204, and that different sets of navigation data may be utilized to cause different pre-trained models to learn the interaction between the applicable known terrain and the applicable continuous track component.

In one or more embodiments, when the pre-trained models of the model library comprise GP models, the GP models are fitted by collected data on each known terrain, including the PWM signal S and the corresponding vehicle component's linear and angular speeds $u=[v, \omega]^T$ calculated based on the vehicle localization output. In one or more embodiments, u is then mapped to the PWM signals S for controlling the motors driving each continuous track of the vehicle. The terrain track interaction may be captured by the GP model: S=gp(u). In one or more embodiments, where S is two-dimensional, corresponding to the left and right continuous track motors, two one-dimensional GP models are fitted for each known terrain (e.g., corresponding to different pre-trained models of a subset of pre-trained models of the model library 208 of FIG. 2).

In one or more embodiments, the radial basis function (RBF) kernel is used in the GP models:

$$\kappa(u_i, u_j) = \sigma_f^2 \exp\left(-\frac{1}{2}(u_i - u_j)^T L^{-2}(u_i - u_j)\right) + \sigma_n^2$$

where L is the diagonal length scale matrix and $\sigma_f$, $\sigma_n$ represent the data and prior noise variance, and $u_i$, $u_j$ represent data features.

Accordingly, different GP models (or other types of models) may be fitted and stored for different terrain types. As will be described in more detail hereinbelow, when a continuous track vehicle is driving on a certain terrain, GP models that correspond to that terrain may be selected to optimize control performance.

C. Embodiments of Adaptive Trajectory Control Using Model Library

Figure 3A:
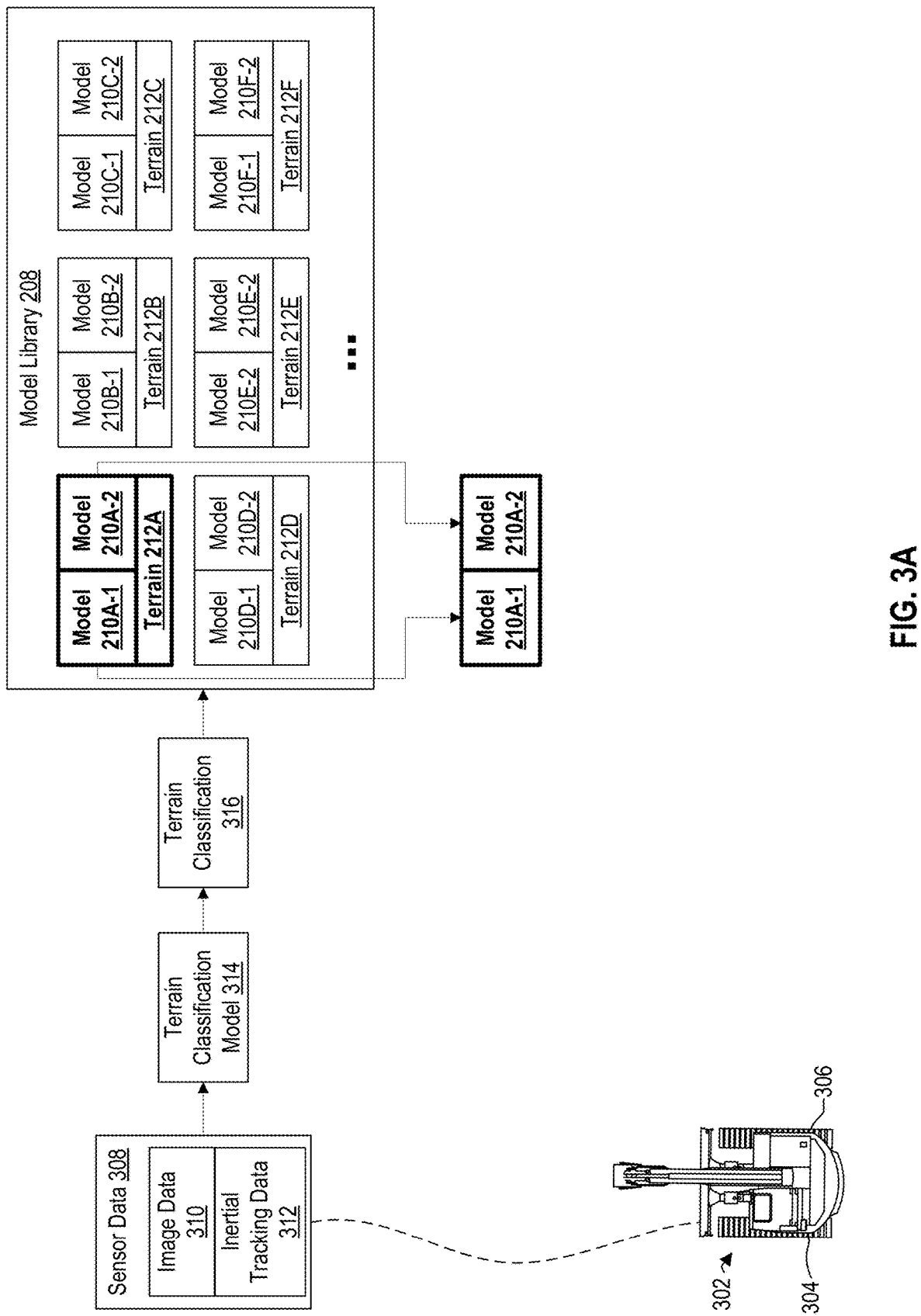
FIG. 3A depicts a conceptual representation of selecting a subset of models from a model library based upon terrain classification, according to embodiments of the present disclosure.

FIG. 3A shows a conceptual representation of a continuous track vehicle 302 (e.g., an excavator), which includes a first track 304 (e.g., a left track) and a second track 306 (e.g., a right track), according to embodiments of the present disclosure. As noted above, the principles described herein related to control of locomotion components (e.g., tracks) of a vehicle (e.g., a continuous track vehicle) may be applied in other contexts (e.g., continuous track vehicles with other quantities or arrangements of tracks, or other types of vehicles with different locomotion components such as wheels).

Figure 8:
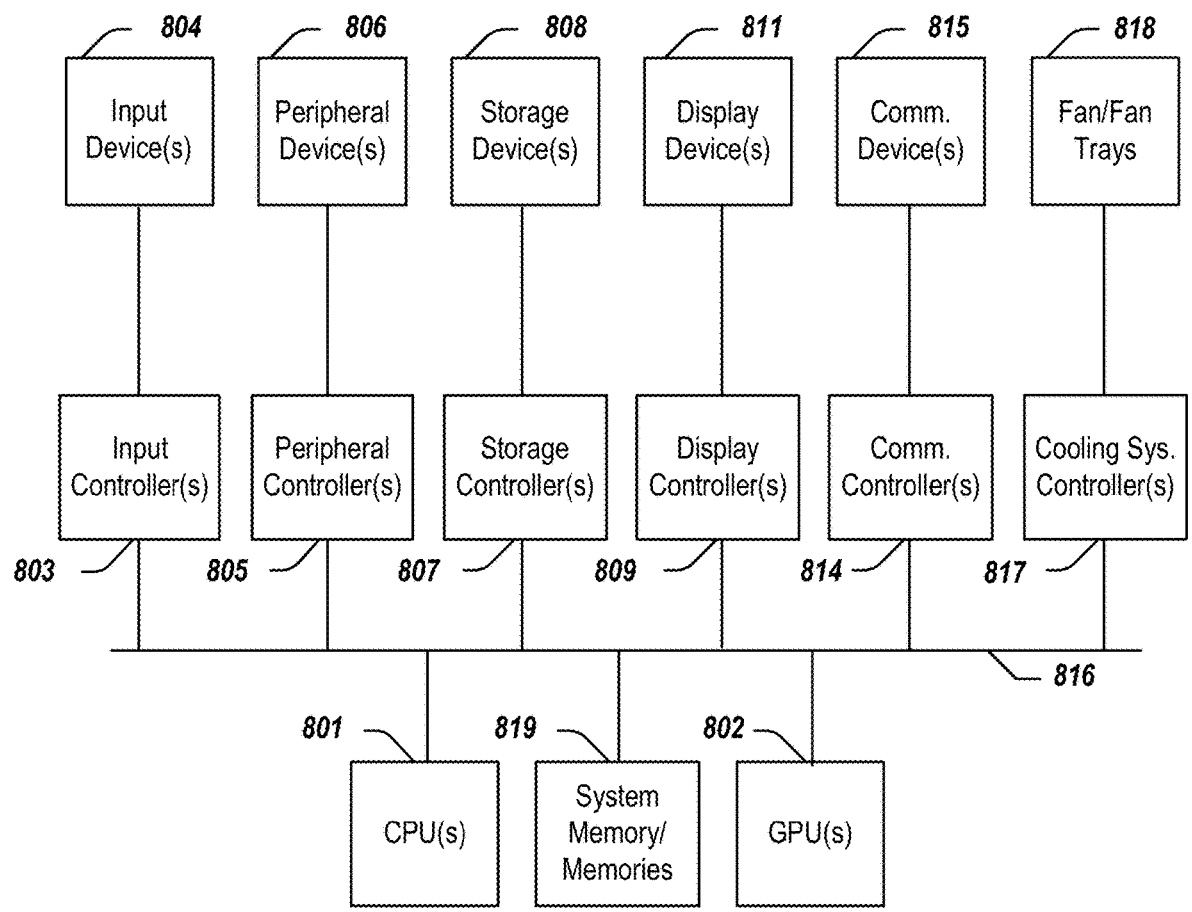
FIG. 8 depicts a simplified block diagram of a computing device/information handling system, according to embodiments of the present disclosure.

FIG. 3A depicts sensor data 308, which may be acquired by one or more sensors (e.g., peripheral device(s) 806 in FIG. 8 or other sensor inputs not depicted in FIG. 8) associated with the continuous track vehicle 302 as the continuous track vehicle traverses terrain. Such sensors may include, by way of non-limiting example, inertial measurement units and/or components (e.g., accelerometers, gyroscopes, magnetometers), image sensors, localization components (e.g., global positioning systems), and/or others. In the example of FIG. 3A, the sensor data 308 includes image data 310 (e.g., acquired by one or more sensors) and inertial tracking data 312 (e.g., acquired by one or more inertial measurement units).

The sensor data 308 may be provided as input to a terrain classification model 314. The terrain classification model 314 is configured to output a label of terrain classification 316 in response to input sensor data (e.g., image data 310 and/or inertial tracking data 312). The terrain classification model 314 may take on various forms and may include various components or computational frameworks/structures, such as, by way of non-limiting example, decision trees, random forests, support vector machines (SVMs), convolutional neural networks (CNNs), deep neural networks (DNN), Gaussian mixture models (GMMs), and/or others. FIG. 3A depicts a terrain classification 316 output by the terrain classification model 314 based upon the input sensor data 308.

FIG. 3A furthermore depicts the terrain classification 316 being utilized to select a subset of pre-trained models from the model library 208. As noted above, each subset of pre-trained models (depicted in FIGS. 2 and 3A as abutting pairs of models that are spatially offset from other pairs) is associated with a known terrain about which the models of the subset of pre-trained models are trained. For instance, the subset including models 210A-1 and 210A-2 is associated with terrain 212A, whereas the subset including models 210B-1 and 210B-2 is associated with terrain 212B. Based upon the terrain classification 316, a system may identify a subset of pre-trained models from the model library that is associated with a terrain that corresponds to (or most closely corresponds to) the terrain type classification 316 output by the terrain type classification model 314.

In one or more embodiments, the terrain type classification 316 comprises a discrete terrain label that may be used to search for a corresponding known terrain represented in the model library 208. In one or more embodiments, the terrain classification 316 comprises terrain features, embeddings, or other representations of terrain characteristics that are used to determine similarity between the terrain classification 316 and the known terrains represented in the model library 208 (which may be stored in the model library 208 with corresponding features, embeddings, or other representations). In one or more embodiments, the sensor data 308 is directly utilized to identify a known terrain represented in the model library 208 that most closely corresponds to the sensor data 308.

In the example of FIG. 3A, terrain 212A from the model library 208 is identified/selected as corresponding (or most closely corresponding) to the terrain classification 316 (indicated in FIG. 3A by the bolded representation of terrain 212A). Accordingly, the subset of pre-trained models associated with terrain 212A (i.e., models 210A-1 and 210A-2) is selected for use to facilitate trajectory control of first and second tracks 304 and 306 of the continuous track vehicle 302 (indicated in FIG. 3A by the bolded representation of models 210A-1 and 210A-2 and the extension of models 210A-1 and 210A-2 to a region outside of the model library 208). As noted above, the different models 210A-1 and 210A-2 may be pre-trained to facilitate control of different locomotion components of a continuous track vehicle. In the example of FIG. 3A, model 210A-1 is pre-trained to control the first track 304, and model 210A-2 is pre-trained to control the second track 306.

Figure 3B:
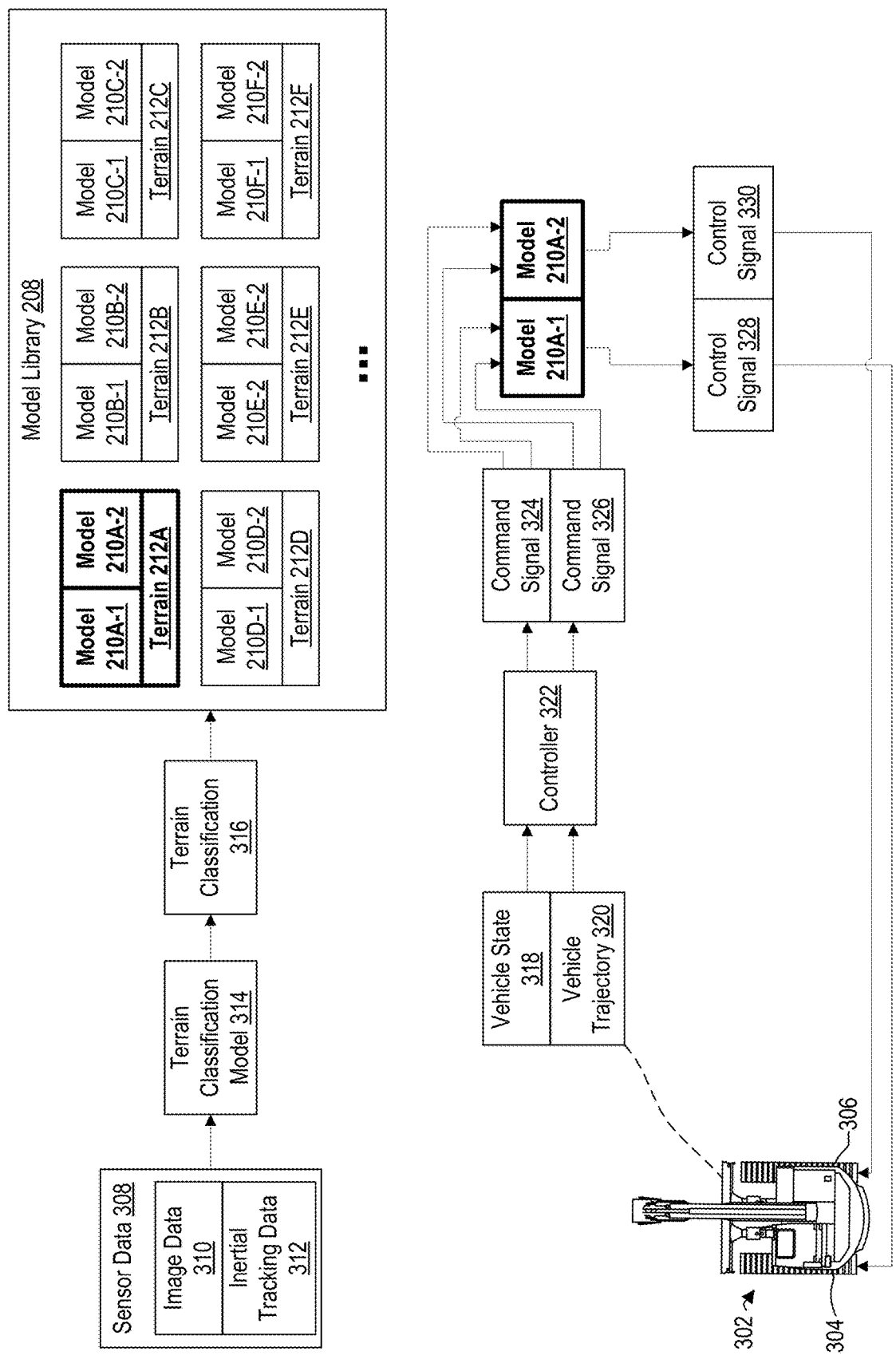
FIG. 3B depicts a conceptual representation of using the subset of models to generate control signals for controlling a continuous track vehicle, according to embodiments of the present disclosure.

FIG. 3B depicts a conceptual representation of using the selected subset of models (i.e., models 210A-1 and 210A-2) to generate control signals for controlling the continuous track vehicle 302, according to embodiments of the present disclosure. In particular, FIG. 3B depicts a vehicle state 318 and a vehicle trajectory 320 associated with the continuous track vehicle 302. The vehicle state 318 and the vehicle trajectory 320 may be determined utilizing sensors and/or upstream models associated with the continuous track vehicle 302. In one or more embodiments, the vehicle state 318 comprises positional coordinates of the continuous track vehicle 302 (e.g., in Cartesian space or another coordinate system), heading/orientation, and/or other state info (e.g., current velocity/acceleration). In one or more embodiments, the vehicle trajectory 320 comprises a planned trajectory (e.g., one or more desired future states) for the continuous track vehicle 302.

In the example of FIG. 3B, the vehicle state 318 and the vehicle trajectory 320 are utilized as input to a controller 322. The controller 322 may take on various forms such as, by way of non-limiting example, a nonlinear model predictive controller (NMPC), a proportional-integral-derivative (PID) controller, a fuzzy logic controller, a reinforcement learning controller, and/or others.

The controller 322 is configured to generate command signals 324 and 326 in response to the vehicle state 318 and vehicle trajectory 320 input. Each command signal may comprise a desired linear and/or angular speed for a track of the continuous track vehicle 302. For instance, command signal 324 may be associated with track 304, and command signal 326 may be associated with track 306.

By way of illustrative example, for a controller 322 implemented as an NMPC, the trajectory control problem at time instance k may be formulated as follows:

$$\min_u J(x(k), U) = \sum_{i=0}^{N-1} (\|Qx(i\mid k)\|_2 + \|Ru(i\mid k)\|_2 + \|R_d \Delta u(i\mid k)\|_2)$$

$$\text{s.t. } x(i+1\mid k) = x(i\mid k) + f(x(i\mid k), u(i\mid k))T_s,$$

$$x(0\mid k) = x_0, x(i\mid k) \in X,$$

$$u(0\mid k) = u_0, u(i\mid k) \in U,$$

$$U = col\{u(0\mid k), \ldots, u(N-1\mid k)\},$$

where N is the prediction horizon, J is the cost function, and Q, R, and $R_d$ are weighting matrices (which may be tuned manually or by other training techniques). In the above example, x(i|k) and u(i|k) denote the predicted values of the model state and input, respectively, at time k+i based on the information that is available at time k. In the above example, $\Delta u(i|k) = u(i|k) - u(i-1|k)$ is included in the cost function to smooth the control output.

In the above example, the state vector is $x = [x_c, y_c, \theta]$, where $x_c$ and $y_c$ are the 2D Cartesian coordinates of the vehicle, and $\theta$ is the heading. The control output vector $u = [v, \omega]$ (command signal 324, 326) may comprise the linear and angular speed commands for the vehicle (e.g., for the different tracks 304, 306 of the continuous track vehicle 302). The nonlinear prediction model f(x,u) may be described by the following equations:

$$\begin{cases} \dot{x} = v \cdot \cos(\theta) \\ \dot{y} = v \cdot \sin(\theta) \\ \dot{\theta} = \omega \end{cases}$$

In one or more embodiments, the output of the NMPC, u, is mapped during training to the signals S output by GP models.

In the example of FIG. 3B, the command signals 324 and 326 (e.g., angular and/or linear speed commands) are utilized as input to the pre-trained models 210A-1 and 210A-2 that were selected based upon the terrain classification 316 and/or sensor data 308. FIG. 3B depicts both command signals 324 and 326 being provided as input to both of the selected pre-trained models 210A-1 and 210A-2. The pre-trained models 210A-1 and 210A-2 utilize the input command signals 324 and 326 to generate control signals 328 and 330. In the example of FIG. 3B, control signal 328 (output by model 210A-1) is configured to control track 304 of the continuous track vehicle 302, and control signal 330 (output by model 210A-2) is configured to control track 306 of the continuous track vehicle 302. The control signals 328 and 330 may take on various forms, such as pulse-width modulated (PWM) signals.

The control signals 328 and 330 may be utilized to facilitate control of the tracks 304 and 306 of the continuous track vehicle 302 (e.g., to control track motors that drive the tracks 304 and 306). In the example of FIG. 3B, control signal 328 is used to control track 304 (as indicated by the arrow extending from the control signal 328 to the track 304), and control signal 330 is used to control track 306 (as indicated by the arrow extending from the control signal 330 to the track 306). In one or more embodiments, utilizing pre-trained models (which are tuned for particular terrains and selected based on detected terrain type at runtime) to process the speed command signals output by a controller can improve the ability of a trajectory control system to account for terrain-track interactions and track interdependency that results from terrain-track interactions.

D. Experimental Results

Figure 4:
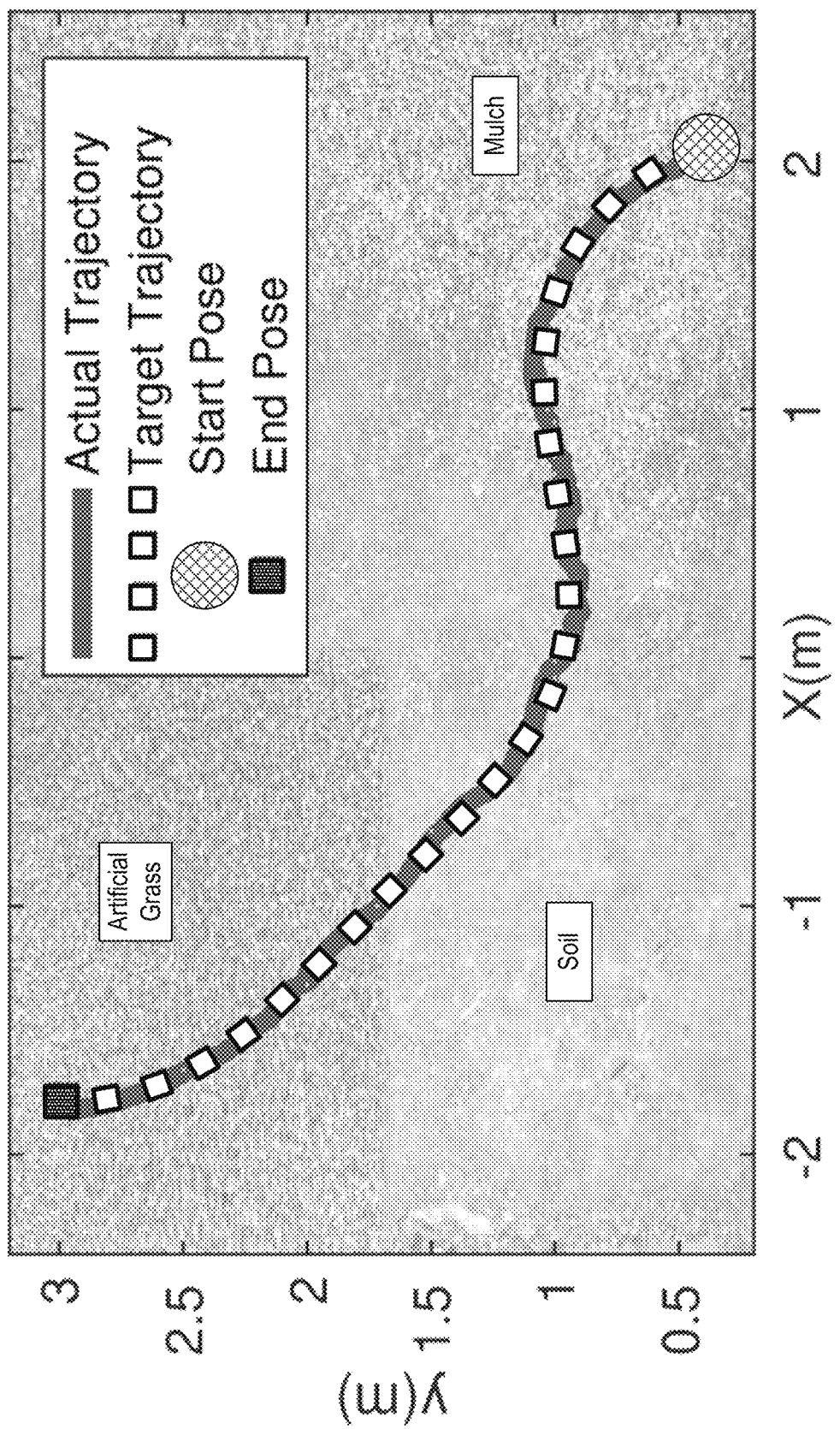

FIG. 4 and FIG. 5 depict example test results from implementing an adaptive trajectory controller, as disclosed herein, to control a continuous track vehicle. To perform the tests, approximately 5000 images of size 1280×720 among 11 different terrain types and the corresponding inertial sequences were collected at 30 Hz. The 11 terrain types include black carpet, green carpet, smooth tiles, concrete, grass, soil, mulch, wood rocks, rocky surface, asphalt, and small rocks. For each terrain, about 1500 data pairs {S, u} were collected and used to train GP models.

A continuous track vehicle was used to evaluate the performance of an embodiment of the adaptive trajectory control methodology disclosed herein. The external dimension of the vehicle was 390×270×145 mm, and the track width for each of the two tracks was 40 mm. The vehicle had a 12V DC motor with 5 kg-cm rated torque specs on each side of the vehicle, enabling the vehicle to carry a maximum payload of 30 kg. The vehicle was equipped with a NVIDIA Jetson AGX Orin for processing, a single-line LiDAR (RPLiDAR-A3) for navigation, a 1080p camera (Logitech C920) for terrain image capturing, and an IMU (3DM-GX5-25) for motion data recording. All computations, including data processing, inference, and control were computed on-device.

Multiple test cases were conducted using the adaptive control techniques discussed herein with the same planned trajectories covering three different terrains, including mulch and soil as known surfaces, and artificial grass as an unknown surface. The adaptive control framework utilized in the experiments utilized pre-trained GP models in combination with an NMPC controller. FIG. 4 depicts a representative test case, showing that the adaptive control techniques enabled the vehicle to closely follow the target trajectory, even over multiple different terrains.

For comparison, carpet and mulch controllers were chosen as baseline controllers to control the vehicle to follow the target trajectory. The tracking error for the adaptive and the baseline controllers are shown in FIG. 5. As is evident from FIG. 5, the adaptive control framework disclosed herein had the best performance in terms of the root-mean-square error (RMSE) between the actual and target trajectories.

It shall be noted that these experiments and results are provided by way of illustration and were performed under specific conditions using a specific embodiment or embodiments; accordingly, neither these experiments nor their results shall be used to limit the scope of the disclosure of the current patent document.

E. Example Method Embodiments

Figure 6:
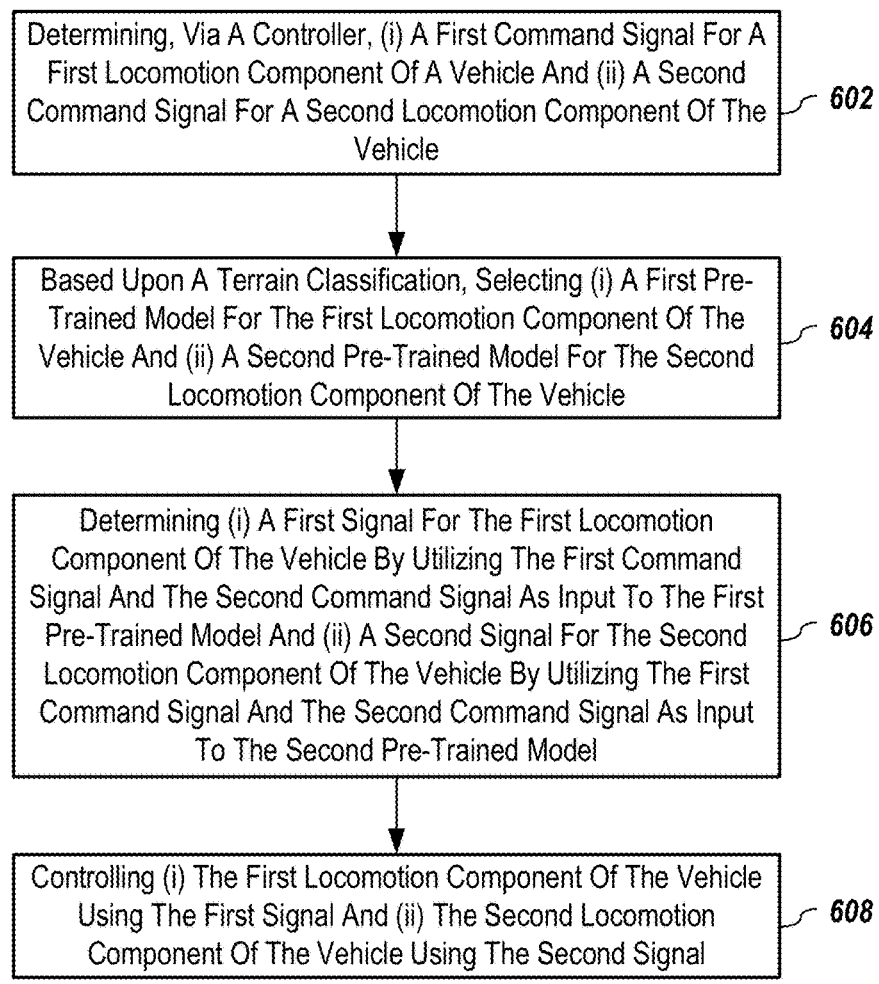
FIG. 6 and FIG. 7 depict example flow diagrams including acts associated with facilitating trajectory control of a vehicle, according to embodiments of the present disclosure.
Figure 7:
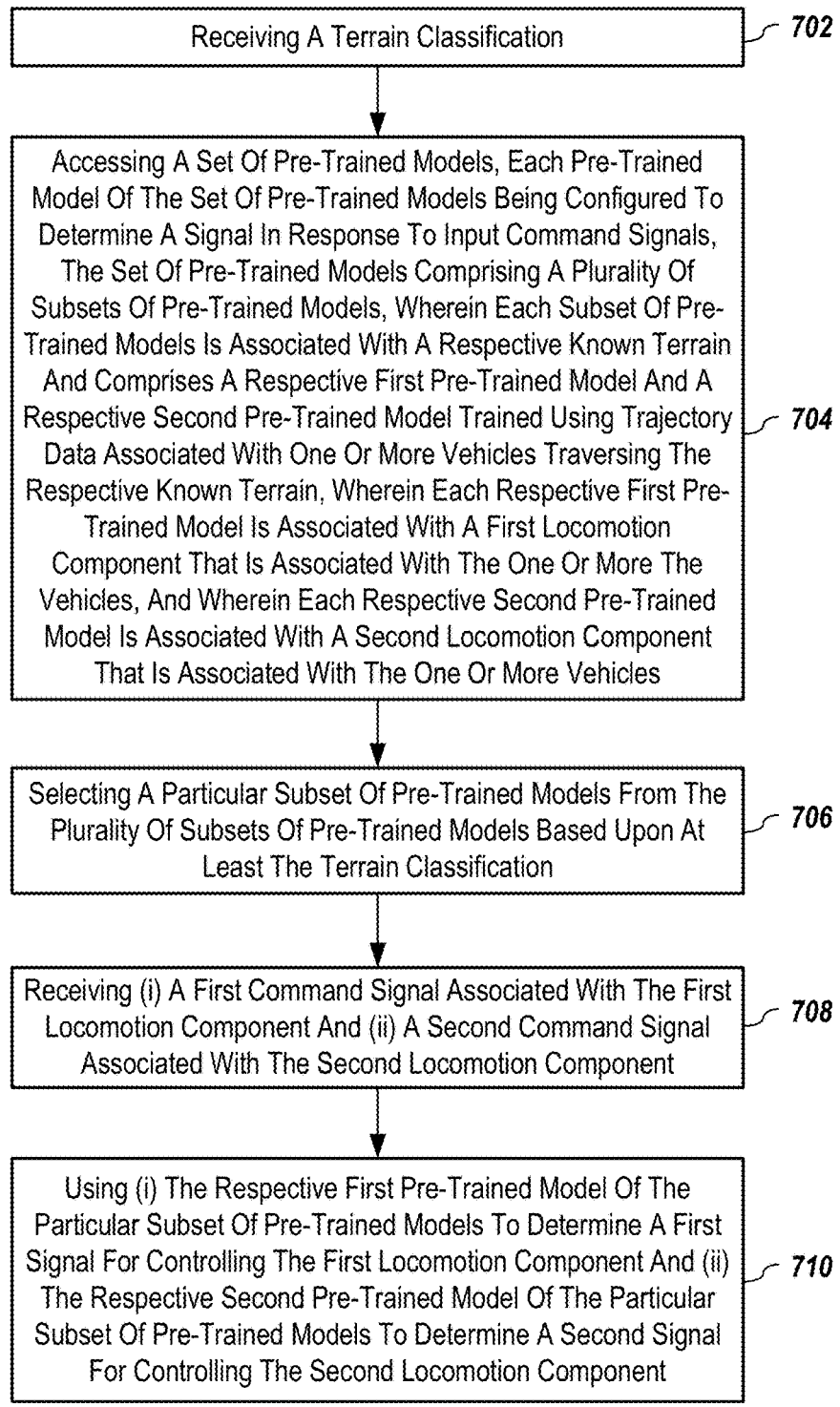

FIG. 6 and FIG. 7 depict example flow diagrams 600 and 700, respectively, depicting acts associated with facilitating trajectory control of a vehicle, according to embodiments of the present disclosure. As noted above, (1) certain steps may optionally be performed; (2) steps may not be limited to the specific order set forth herein; (3) certain steps may be performed in different orders; and (4) certain steps may be done concurrently.

Act 602 of flow diagram 600 includes determining, via a controller, (i) a first command signal for a first locomotion component of a vehicle and (ii) a second command signal for a second locomotion component of the vehicle. In one or more embodiments, the controller comprises a nonlinear model predictive controller that determines the first command signal and the second command signal based upon vehicle state input and vehicle trajectory input. In some implementations, the first locomotion component and the second locomotion component each comprise continuous track locomotion components.

Act 604 of flow diagram 600 of FIG. 6 includes, based upon a terrain classification, selecting (i) a first pre-trained model for the first locomotion component of the vehicle and (ii) a second pre-trained model for the second locomotion component of the vehicle. In some examples, the terrain classification is obtained from a terrain classification model that uses image data, inertial measurement unit data, and/or other data as inputs. In one or more embodiments, selecting the first pre-trained model and the second pre-trained model is further based upon the image data or the inertial measurement data. In one or more embodiments, the first model and the second model each comprise a set of Gaussian Process Models (GPMs) in which each GPM is correlated to a terrain type.

Act 606 of flow diagram 600 includes determining (i) a first signal for the first locomotion component of the vehicle by utilizing the first command signal and the second command signal as input to the first pre-trained model and (ii) a second signal for the second locomotion component of the vehicle by utilizing the first command signal and the second command signal as input to the second pre-trained model. In one or more embodiments, the first signal comprises a first pulse-width modulated signal, and the second signal comprises a second pulse-width modulated signal.

Act 608 of flow diagram 600 includes controlling (i) the first locomotion component of the vehicle using the first signal and (ii) the second locomotion component of the vehicle using the second signal.

Act 702 of flow diagram 700 of FIG. 7 includes receiving a terrain classification. In one or more embodiments, the terrain classification is obtained from a terrain classification model that uses image data, inertial measurement data, and/or other data as inputs.

Act 704 of flow diagram 700 includes accessing a set of pre-trained models, each pre-trained model of the set of pre-trained models being configured to determine a signal in response to input command signals, the set of pre-trained models comprising a plurality of subsets of pre-trained models, wherein each subset of pre-trained models is associated with a respective known terrain and comprises a respective first pre-trained model and a respective second pre-trained model trained using trajectory data associated with one or more vehicles traversing the respective known terrain, wherein each respective first pre-trained model is associated with a first locomotion component that is associated with the one or more the vehicles, and wherein each respective second pre-trained model is associated with a second locomotion component that is associated with the one or more vehicles. In one or more embodiments, the set of pre-trained models comprises a set of Gaussian Process Models (GPMs). In one or more embodiments, the first locomotion component and the second locomotion component each comprise continuous track locomotion components.

Act 706 of flow diagram 700 includes selecting a particular subset of pre-trained models from the plurality of subsets of pre-trained models based upon at least the terrain classification. In one or more embodiments, selecting the particular subset of pre-trained models may be further based upon the image data, the inertial measurement data, or other data.

Act 708 of flow diagram 700 includes receiving (i) a first command signal associated with the first locomotion component and (ii) a second command signal associated with the second locomotion component. In one or more embodiments, the first command signal and the second command signal are obtained from a nonlinear model predictive controller. In one or more embodiments, the nonlinear model predictive controller determines the first command signal and the second command signal based upon vehicle state input and vehicle trajectory input.

Act 710 of flow diagram 700 includes using (i) the respective first pre-trained model of the particular subset of pre-trained models to determine a first signal for controlling the first locomotion component and (ii) the respective second pre-trained model of the particular subset of pre-trained models to determine a second signal for controlling the second locomotion component. In one or more embodiments, the first pre-trained model utilizes both the first command signal and the second command signal as input to determine the first signal, and the second pre-trained model utilizes both the first command signal and the second command signal as input to determine the second signal. In one or more embodiments, the first signal comprises a first pulse-width modulated signal, and the second signal comprises a second pulse-width modulated signal. In one or more embodiments, the first pre-trained model may utilize the first command signal as an input to determine the first signal, and the second pre-trained model may utilize the second command signal as input to determine the second signal.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provide computing resources and control the computer. CPU 801 may be implemented with a microprocessor or the like, and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripheral devices 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for controlling a trajectory of a continuous track vehicle based upon vehicle trajectory input, comprising:
   determining, via a controller, (i) a first command signal for a first locomotion component of a vehicle and (ii) a second command signal for a second locomotion component of the vehicle;
   based upon a terrain classification, selecting (i) a first pre-trained model for the first locomotion component of the vehicle and (ii) a second pre-trained model for the second locomotion component of the vehicle;
   determining (i) a first signal for the first locomotion component of the vehicle by utilizing the first command signal and the second command signal as input to the first pre-trained model and (ii) a second signal for the second locomotion component of the vehicle by utilizing the first command signal and the second command signal as input to the second pre-trained model; and
   controlling (i) the first locomotion component of the vehicle using the first signal and (ii) the second locomotion component of the vehicle using the second signal;
   wherein the controller comprises a nonlinear model predictive controller that determines the first command signal and the second command signal based upon vehicle state input and based upon the vehicle trajectory input; and
   wherein the first locomotion component and the second locomotion component each comprise continuous track locomotion components.

2. The computer-implemented method of claim 1, wherein the first signal comprises a first pulse-width modulated signal, and wherein the second signal comprises a second pulse-width modulated signal.

3. The computer-implemented method of claim 1, wherein the terrain classification is obtained from a terrain classification model that uses image data, inertial measurement unit data, or both as inputs.

4. The computer-implemented method of claim 3, wherein selecting the first pre-trained model and the second pre-trained model is further based upon the image data or the inertial measurement data.

5. The computer-implemented method of claim 1, wherein the first model and the second model comprise a set of Gaussian Process Models (GPMs) in which each GPM is correlated to a terrain type.

6. A computer-implemented method for facilitating trajectory control of a continuous track vehicle based upon vehicle trajectory input, comprising:
- receiving a terrain classification;
- accessing a set of pre-trained models, each pre-trained model of the set of pre-trained models being configured to determine a signal in response to input command signals, the set of pre-trained models comprising a plurality of subsets of pre-trained models, wherein each subset of pre-trained models is associated with a respective known terrain;
- each subset of pre-trained models comprising a respective first pre-trained model of the subset and a respective second pre-trained model of the subset trained using trajectory data associated with one or more vehicles traversing the respective known terrain, wherein each respective first pre-trained model of the subset is associated with a first locomotion component that is associated with the one or more vehicles, and wherein each respective second pre-trained model of the subset is associated with a second locomotion component that is associated with the one or more vehicles;
- selecting a particular subset of pre-trained models from the plurality of subsets of pre-trained models based upon at least the terrain classification;
- receiving (i) a first command signal associated with the first locomotion component and (ii) a second command signal associated with the second locomotion component; and
- determining (i) a first signal based on the respective first pre-trained model of the selected subset of pre-trained models and (ii) a second signal based on the respective second pre-trained model of the selected subset of pre-trained models; and
- controlling the first locomotion component based on the determined first signal and controlling the second locomotion component based on the determined second signal;
- wherein the first command signal and the second command signal are obtained from a nonlinear model predictive controller; and
- wherein the nonlinear model predictive controller determines the first command signal and the second command signal based upon vehicle state input and based upon the vehicle trajectory input; and
- wherein the first locomotion component and the second locomotion component each comprise continuous track locomotion components.

7. The computer-implemented method of claim 6, wherein the first pre-trained model utilizes both the first command signal and the second command signal as input to determine the first signal, and wherein the second pre-trained model utilizes both the first command signal and the second command signal as input to determine the second signal.

8. The computer-implemented method of claim 6, wherein the set of pre-trained models comprises a set of Gaussian Process Models (GPMs).

9. The computer-implemented method of claim 6, wherein the first signal comprises a first pulse-width modulated signal, and wherein the second signal comprises a second pulse-width modulated signal.

10. The computer-implemented method of claim 6, wherein the terrain classification is obtained from a terrain classification model that uses image data, inertial measurement data, or both as inputs.

11. The computer-implemented method of claim 10, wherein selecting the particular subset of pre-trained models is further based upon the image data or the inertial measurement data.

12. A system for controlling a trajectory of a continuous track vehicle based upon vehicle trajectory input, comprising:
- one or more processors; and
- a non-transitory computer-readable medium or media comprising one or more sets of instructions which, when executed by at least one of the one or more processors, causes steps to be performed comprising:
- determining, via a controller, (i) a first command signal for a first locomotion component of a vehicle and (ii) a second command signal for a second locomotion component of the vehicle;
- selecting (i) a first pre-trained model for the first locomotion component of the vehicle and (ii) a second pre-trained model for the second locomotion component of the vehicle;
- determining (i) a first signal for the first locomotion component of the vehicle by utilizing the first command signal and the second command signal as input to the first pre-trained model and (ii) a second signal for the second locomotion component of the vehicle by utilizing the first command signal and the second command signal as input to the second pre-trained model; and
- controlling (i) the first locomotion component of the vehicle using the first signal and (ii) the second locomotion component of the vehicle using the second signal;
- wherein the controller comprises a nonlinear model predictive controller that determines the first command signal and the second command signal based upon vehicle state input and the vehicle trajectory input; and
- wherein the first locomotion component and the second locomotion component each comprise continuous track locomotion components.

13. The system of claim 12, wherein the first pre-trained model and the second pre-trained model are selected based upon a terrain classification, and wherein the terrain classification is obtained from a terrain classification model that uses image data, inertial measurement unit data, or both as inputs.

* * * * *